United States Patent [19]

Okada

[11] Patent Number: 4,493,594
[45] Date of Patent: Jan. 15, 1985

[54] MILLING CUTTER

[75] Inventor: Minoru Okada, Yokosuka, Japan

[73] Assignee: Santrade Ltd., Luzern, Switzerland

[21] Appl. No.: 543,801

[22] PCT Filed: Jun. 19, 1979

[86] PCT No.: PCT/SE79/00140
§ 371 Date: Jan. 9, 1981
§ 102(e) Date: Jan. 9, 1981

[87] PCT Pub. No.: WO80/02812
PCT Pub. Date: Dec. 24, 1980

Related U.S. Application Data

[63] Continuation of Ser. No. 229,563, Oct. 9, 1981, abandoned.

[51] Int. Cl.³ ............................................. B23C 5/22
[52] U.S. Cl. ........................................ 407/41; 407/49
[58] Field of Search .............. 407/41, 49, 50, 94, 407/95, 100, 108, 115, 47, 107

[56] References Cited

U.S. PATENT DOCUMENTS

| 910,413 | 1/1909 | Perkins et al. | |
|---|---|---|---|
| 2,967,442 | 1/1961 | Forsyth et al. | |
| 3,056,186 | 10/1962 | Greenleaf | 407/41 |
| 3,104,453 | 9/1963 | Greenleaf | 407/41 |
| 3,116,538 | 1/1964 | Severson | 407/41 |
| 3,200,474 | 8/1965 | Kralowetz | 407/60 |
| 3,229,350 | 1/1966 | Yogus | 407/41 |
| 3,246,382 | 4/1966 | Zierden | 407/107 |
| 3,268,977 | 8/1966 | Diemond | 407/107 |
| 3,273,222 | 9/1966 | Begle | 407/41 |
| 3,391,438 | 7/1968 | Milewski | 407/41 |
| 3,475,802 | 11/1969 | Kollar | 407/107 |
| 3,757,397 | 9/1973 | Lindsay | 407/41 |

FOREIGN PATENT DOCUMENTS

| 2715281 | 1/1978 | Fed. Rep. of Germany | |
|---|---|---|---|
| 138284 | 10/1979 | Fed. Rep. of Germany | 407/41 |
| 1303995 | 1/1973 | United Kingdom | |
| 1414775 | 11/1975 | United Kingdom | |

Primary Examiner—Leonidas Vlachos
Assistant Examiner—Jerry Kearns
Attorney, Agent, or Firm—Burns, Doane, Swecker & Mathis

[57] ABSTRACT

A milling cutter for clamped cutting inserts (12) which are held in position by means of a clamping means (14), which rests against the cutting insert (12) at a first contact surface (17) and against the cutter body (10) at a second contact surface (24). In order to obtain a large chip pocket by means of a clamping means (14) having short radial extent the clamping means is designed such that the distance between the first contact surface (17) and a supporting surface (21) for supporting the cutting insert is larger than the distance between the supporting surface (21) and the second contact surface (24).

4 Claims, 6 Drawing Figures

MILLING CUTTER

This application is a continuation of application Ser. No. 229,563, filed Jan. 9, 1981, now abandoned.

BACKGROUND AND OBJECTS OF THE INVENTION

This invention relates to a milling cutter for clamped cutting inserts (as distinguished from inserts secured by brazing), in which a cutting insert is held in position relative to a cutter body by means of a clamping means. The clamping means is adapted to rest against the cutting insert at a first contact surface on a preferably flat first side face on the cutting insert and against the cutter body at a second contact surface. The cutting insert is adapted to rest directly or indirectly against a first supporting surface on the cutter body by means of a second side face, which is opposite to the first side face on the cutting insert. The clamping means is adapted to bridge an edge portion on the cutting insert by means of a side portion which interconnects the first and second contact surfaces without contacting the edge portion; said edge portion being provided on an edge surface which interconnects the first and second side faces of the cutting insert.

An object of the present invention is to provide a clamping means which does not disturb the chip flow without requiring a large extent radially inwards.

Another object of the invention is to positively fix the axial position of the cutting insert.

A further object of the invention is to provide the milling cutter with detachable clamping and supporting means such that cutting with positive as well as negative axial rake angles is possible.

The above and other objects of the invention are attained by giving the invention the characterizing features stated in the claims following hereinafter.

THE DRAWINGS

The invention is described in detail in the following description with reference to the accompanying drawings. It is to be understood that the illustrated embodiments are only shown by way of example and that various modifications may be made within the scope of the claims.

DETAILED DESCRIPTION OF THE INVENTION

Figure 1:
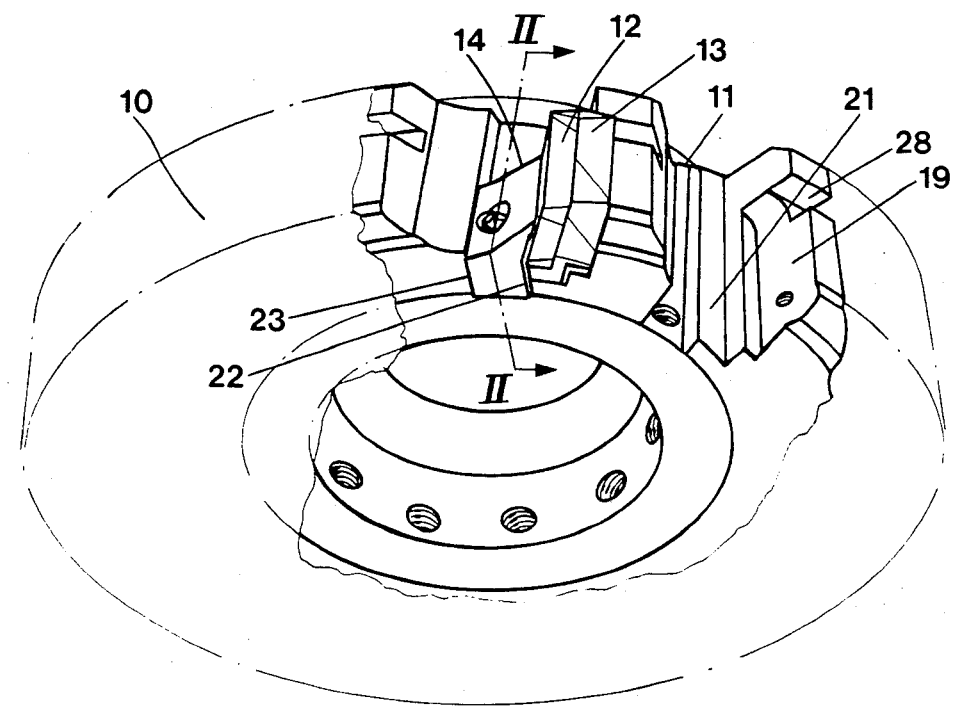
FIG. 1 is a perspective view of a milling cutter according to the invention showing one cutting insert mounted and one cutting insert detached.
Figure 2:
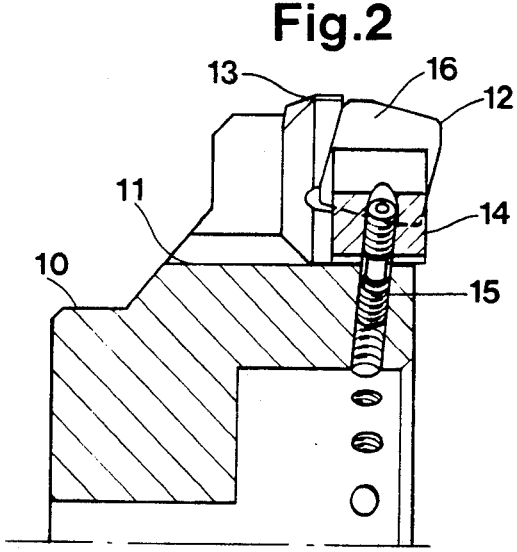
FIG. 2 is a section taken on the line II—II in FIG. 1.
Figure 3:
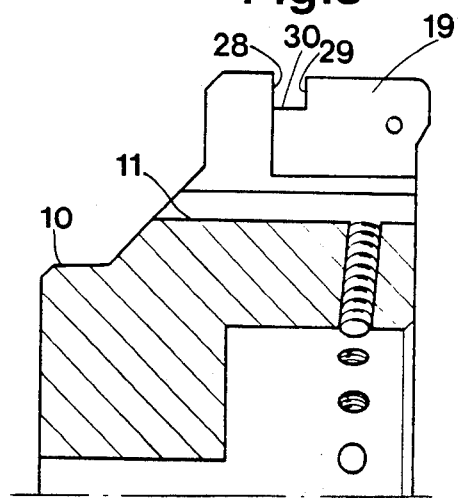
FIG. 3 shows a section corresponding to that in FIG. 2, wherein cutting insert, supporting plate and wedge block are detached.
Figure 4:
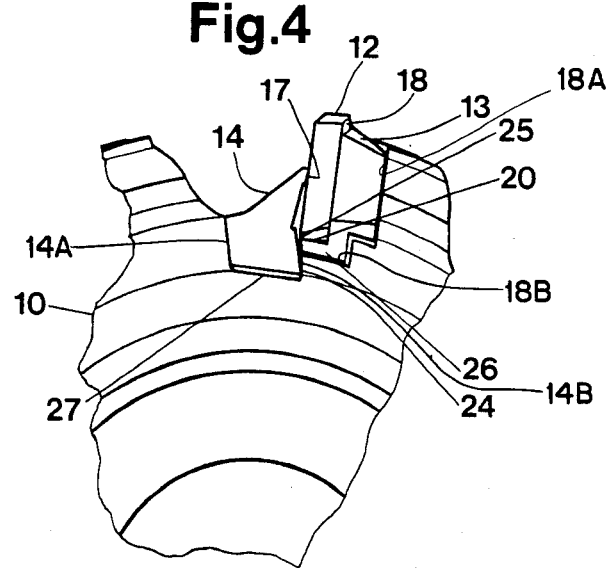
FIG. 4 shows a side view of a portion of the milling cutter in FIG. 1.

In the drawings, the cutter body of the milling cutter is denoted by 10. The cutter body has recesses 11 in the periphery thereof for tungsten carbide cutting inserts 12 and their clamping and supporting means. The supporting means of the cutting inserts 12 consist of detachable supporting shim plates or supporting seats 13. The clamping means consist of detachable wedge blocks 14. The wedge blocks 14 are clamped against the cutting insert 12 by means of screws 15. The screw 15 is provided with a left hand thread portion and a right hand thread portion; the one portion being screwed into the wedge block 14 and the other portion into the cutter body 10.

The cutting insert 12 is provided with opposite flat side faces 16, 18. The wedge block 14 bears against a reaction surface 14A of the cutter body and rests against the side face 16 at a contact surface 17. By means of its side face 18 the cutting insert 12 rests against a side wall 13A of the supporting plate 13. The supporting plate 13 also has a first seating surface 18A which is attached to a supporting surface 19 on the cutter body by means of a screw, not shown.

By means of a radially inner edge surface 20 the cutting insert 12 rests against a stepped portion 26 on the supporting plate 13 which in turn has a second seating surface 18B which rests against a second supporting surface 21 on the cutter body 10 which defines part of a floor of the recess. The edge surface 20 interconnects the side faces 16, 18 of the cutting insert. The insert is thus received in a pocket defined by the stepped portion 26 and the side wall 13A.

The wedge block 14 comprises a base portion which is provided with a first side face 22, which faces the cutting insert 12, and a second side face 23 which is opposite to and parallel with the side face 22 and bears against the reaction surface 14A. By means of its side face 22 the wedge block 14 rests against a second reaction surface 14B of the cutter body at a contact surface 24. By means of its side portion interconnecting the contact surfaces 17, 24 the wedge block 14, then, is adapted to bridge the edge portion 25 of the edge surface 20 being closest to the wedge block without contacting said edge portion.

An object of the invention is to design the wedge block 14 such that it does not disturb the chip flow. This is attained by giving the top side of the wedge block 14 a steep slope from the contact surface 17, thereby providing a large chip pocket. This design is possible by arranging the contact surface 24 under the cutting insert 12, i.e. in such a way that a straight line interconnecting the contact surfaces 17, 24 intersects the edge surface 20 on the cutting insert 12. In addition to providing a large chip pocket the invention seeks to design the wedge block 14 such that it extends radially inwardly a distance as small as possible. An object of the invention, thus, is also to limit the depth of a clamp-receiving groove or slot 27 defined by the reaction surfaces 14A, 14B in the cutter body 10 at the bottom of the recess 11 because a large depth thereof weakens the cutter body 10.

According to the invention these objects are attained by a wedge block design such that the distance between the contact surface 17 and the supporting surface 21 is larger than the distance between the supporting surface 21 and the contact surface 24.

It follows, then, that an imaginary line extending from the radially innermost point of the first area of contact 17 and the second supporting surface 21 is longer than the distance between the second supporting surface 21 and the radially innermost point of the second area of contact 24. Suitably, the ratio between these distances should be larger than 1:5:1, preferably larger than 2:1.

The side faces 22, 23 of the base portion of the wedge block 14 are directed radially inwards and rearwards in such a way that a plane which is transversal to the side faces 22, 23 and to the side face 16 of the cutting insert intersects the side faces 16, 22 along two lines, which form the sides of a triangle wherein the line interconnecting the contact surfaces 17, 24 forms the base; said triangle having an obtuse angle between its sides. The side walls of the groove 17 in the cutter body 10 are substantially parallel with its respective side face 22, 23 of the base portion of the wedge block 14.

In the illustrated embodiments the cutting insert 12 is supported by the shim plate 13. The fact that the shim plate and the wedge block 14 are detachable increases the flexibility of the milling cutter, i.e. different types of cutting inserts can be used. However, it is possible to apply the invention in a milling cutter having no shim plates; in this case the cutting insert 12 rests directly against the supporting surface 21.

In the cutter body 10 there is a peripheral groove 30 the side walls 28, 29 of which are adapted to positively secure the axial position of the cutting insert 12 by providing supporting surfaces for the shim plate 13; these supporting surfaces being transversal to the supporting surface 19. In the embodiment according to FIGS. 1-4 the supporting surface 28 projects in front of the supporting surface 29 seen in the rotational direction of the milling cutter, and the supporting surface 19 extends radially inwardly of the supporting surfaces 28, 29. The bounding walls of the recess 11, i.e. the supporting surface 19 and the side face 23, make an angle with the longitudinal direction of the cutter body 10 such that the axially outer ends of the surfaces 19, 23 are in front of the axially inner ends thereof seen in the rotational direction of the milling cutter. Due to the fact that the side faces 16, 18 of the cutting insert are parallel with the supporting surface 19 a positive axial rake angle, thus, is obtained. During assembling of the cutting insert 12 and the supporting plate 13 the latter is forced against the supporting surface 28, thereby fixing the axial position of the cutting insert 12.

Figure 5:
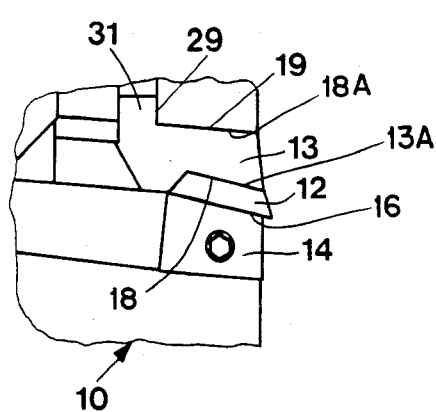
FIG. 5 shows a fragmentary top view of the milling cutter in FIG. 1 having a modified supporting plate.

In FIG. 5 a modified embodiment of the supporting plate 13 is shown which is particularly suitable in connection with large positive axial rake angles, i.e. where the side faces 16, 18 of the cutting insert 12 make a larger angle with the longitudinal axis of the cutter body than the supporting surface 19. The supporting plate 13 is provided with a flange 31 which projects into the groove 30. During assembling the flange 31 is forced against the supporting surface 29 which fixes the axial position of the cutting insert 12 due to the axially outwardly directed force which is applied on the supporting plate 13 during attachment of the wedge block 14. The embodiment of the supporting plate 13 shown in FIG. 5 can, of course, also be used in connection with the axial rake angle shown in FIGS. 1-4, in which case it is not required that the supporting surface 28 projects in front of the supporting surface 29.

Figure 6:
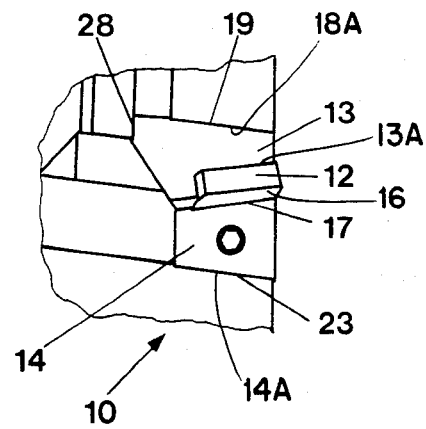
FIG. 6 shows a fragmentary top view of the milling cutter in FIG. 1 having the supporting plate and the wedge block designed such that a negative axial rake angle is obtained.

FIG. 6 shows an embodiment where the supporting shim plate 13 and the wedge block 14 are designed such that a negative axial rake angle is obtained. According to the invention, then, the two surfaces of the wedge block 14 at the contact surface 17 and the side face 23 are directed in such a way that they diverge axially outwards. The supporting surface 19 in the cutter body 10 and the side face 16 of the cutting insert 12 converge axially outwards, thereby causing the supporting plate 13 to be forced against the supporting surface 28 during clamping of the cutting insert 12 by means of the wedge block 14.

The invention is applicable in connection with all types of cutting inserts, such as square, rectangular, triangular and round inserts, positive and negative ones, as well as in connection with milling cutters of the type called "Shear-Clear".

I claim:

1. In a rotary milling cutter of the type comprising a rotary cutter body having a plurality of circumferentially spaced apart recesses, and a plurality of cutter means mounted in said recesses, the improvement wherein:

each of said recesses includes a first and second supporting surfaces, and first and second reaction surfaces, said first supporting surface extending generally radially inwardly from an outer periphery of said body, said second supporting surface facing generally radially outwardly and defining a portion of a floor of said recess, said first reaction surface spaced circumferentially from said first and second supporting surfaces and oriented generally radially, and said second reaction surface extending generally radially inwardly from said second supporting surface and being situated opposite said first reaction surface to form therewith a clamp-receiving groove, each of said cutter means comprises:

a supporting plate mounted in a respective one of said recesses and including a first seating surface which engages said first supporting surface, a stepped portion having a second seating surface which engages said second supporting surface, and a side wall extending generally radially outwardly from said stepped portion to define therewith an insert-receiving pocket within said recess, a cutter insert having first and second generally parallel side faces and an edge surface interconnecting said first and second side faces, the intersection of said edge surface and said first side face defining an edge portion of said insert, said second side face engaging said side wall of said pocket, said edge surface resting upon said stepped portion of said supporting body in engagement therewith, clamping means disposed in said clamp-receiving groove for holding said insert in position relative to said cutter body, said clamping means including a first side face, and a second side face disposed opposite said first side face and engaging said first reaction surface, securing means for securing said clamping means to said cutter body and arranged to move said clamping means in a generally radially inward direction toward a clamping position such that said first side face of said clamping means bears against said first side face of said insert to define therewith a first area of contact, said first side face of said clamping means bears against said second reaction surface to define therewith a second area of contact spaced radially inwardly from said first area of contact, said first and second areas of contact being located such that an imaginary straight line interconnecting said first and second areas of contact intersects said edge surface of said insert;

said first supporting surface of said cutter body facing toward said second side face of said insert to absorb circumferentially directed forces of said clamping means, said second supporting surface of said cutter body being disposed between said first and second areas of contact and facing toward said edge surface of said insert to absorb radial inward forces from said cutter means, said first side face of said clamping means being arranged to bridge said edge portion of said insert intermediate said first and second areas of contact without contacting said edge portion, and the distance between the radially innermost point of said first area of contact and said second supporting surface of said body being longer than the distance between said second supporting surface of said body and the radially innermost point of said second area of contact.

2. A milling cutter according to claim 1, wherein said first supporting surface of the cutter body and the first side face of the cutting insert are mutually non-parallel.

3. A milling cutter according to claim 1, wherein the ratio between said distances is larger than 1.5:1.

4. A milling cutter according to claim 3, wherein said ratio is larger than 2:1.

* * * * *